Feb. 6, 1951 H. COLEMAN 2,540,188
VEHICLE TORSION BAR SUSPENSION SYSTEM
Filed Dec. 29, 1947
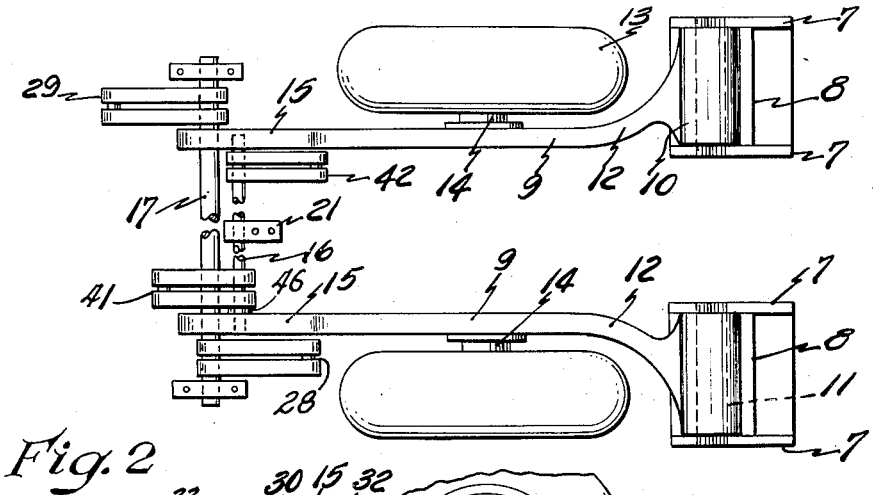
INVENTOR.
Howard Coleman.
BY
Frank C. Harman.
ATTORNEY Patented Feb. 6, 1951

2,540,188

UNITED STATES PATENT OFFICE 2,540,188

VEHICLE TORSION BAR SUSPENSION SYSTEM

Howard Coleman, Bay City, Mich.

Application December 29, 1947, Serial No. 794,295

10 Claims. (Cl. 280—124)

The present invention relates to vehicle suspension systems, and in particular to a torsion bar suspension system for motor vehicles, trailers and the like.

One object of the invention is to provide a torsion bar suspension system for vehicles in which the lower frame structure forms the chassis which will enable the floor structure to be lowered without breaking the continuity thereof.

Another object is to provide a torsion bar suspension system for vehicles which will eliminate transversely extending axles across and underneath the body, thus eliminating axle wells and other recesses which interrupt the continuity of the vehicle floor.

Another object is to provide a torsion bar suspension system for vehicles in which the torsion bars are arranged transversely, and may be located between the upper and lower planes bounding the floor to conserve space at a critical point, facilitate streamlining of the vehicle and eliminating mud and ice catching pockets.

Another object is to provide a torsion bar suspension system for vehicles which will eliminate torsional strains on the floor and frame, but which will yieldingly sustain the vehicle and permit free spring action.

Another object of the invention is to provide a torsion bar suspension system for vehicles, in which the torsion bar may be mounted transversely either in front or in back of the wheel axis to conserve space at the critical passage and cargo area between the wheels.

Another object is to provide a torsion bar suspension system for vehicles which permits of the lowering of the center of load gravity to facilitate safe use of single wheels, lessen the danger of overturning and increase the depth of the loading space.

Another object is to provide a torsion bar suspension system which is light in weight, increases the traction of the vehicle wheels and permits the use of wheels of greater diameter, whereby tire heat will be reduced and rolling performance will be increased.

Another object of the invention is to provide a torsion bar suspension system for vehicles having pivoted cantilevers at each side of the vehicle which are connected by suitable linkage to a pair of transversely extending torsion bars, which are adapted to oppose each other during wheel deflections without placing torsional strains or stresses on the floor and vehicle frame.

Another object of the invention is to provide a torsion bar suspension system for vehicles in which the cantilever or third class levers are arranged so that a minimum of force will be applied to the torsion bars during wheel deflections caused by rough roads, with the result that the torsion bars will not be placed under excessive shock loads.

In the drawing:

Figure 1 is a side-elevational view of the vehicle suspension system showing the manner in which the same is applied to the lower frame structure of a motor vehicle or trailer.

Figure 2 is a top-elevational view of the torsion bar suspension system showing the arrangement of the cantilevers, and the manner in which the ends thereof are connected to a pair of torsion bars by means of oppositely arranged folding levers to set up opposed torsional stresses upon movement of either of the wheel supporting cantilevers in both directions of vertical movement.

Figure 3 is a perspective view of the torsion bar suspension system showing the manner in which the free swinging ends of the cantilever wheel supporting arms are connected to the torsion bars such that movement of one of the cantilever arms will cause the torsion spring bars to be torsionally twisted in opposite directions, and Figure 4 is a sectional view illustrating the swivel connection.

In the drawing, referring more in detail, there is shown a vehicle suspension system which is intended for use in connection with underslung trailers of the commercial type, and for convenience of illustration, Figure 1 illustrates a vehicle in which the underframe forms the chassis and is generally indicated by the reference character 5.

The wheel suspension system may be employed at either the front or back of a motor vehicle, in which case suitable steering and drive mechanism (not shown) may be provided when the suspension system is used in connection with a motor vehicle. It is to be understood, that the torsion bar suspension system is applicable to all types of vehicles, and while the same is described in connection with a trailer vehicle structure, it is not limited to vehicles of this type.

The trailer frame structure 5 shown in Figure 1 is representative of the type in which the lower frame structure forms the chassis to eliminate the weight of the conventional chassis frame, and mounted on the frame rearwardly of the supporting wheels is a pair of bracket plates 6 having upstanding spaced projections 7, reinforced by an integral rib 8. The bracket plates 6 may be secured to the vehicle frame structure 5 by suitable fastening elements such as nuts and bolts, or if the frame structure is of metal, the bracket plates may be welded thereto.

Pivotally mounted between the upstanding side walls 7 of each bracket plate 6 is a cantilever bar 9, having a tubular portion 10 of considerable length so that the ends will abut the upstanding side walls 7 of the bracket plates 6. A pivot pin 11 of the same diameter as the bore of the tubular portion 10 is passed through the tubular portion, and has its ends affixed to the upstanding side walls 7 of the bracket plates 6 by welding or other fastening means. Each cantilever arm is slightly curved as at 12 to offset the arms a slight distance to facilitate the mounting of supporting wheels 13 on suitable wheel axles 14. The wheel axles 14 are secured to the intermediate portions of the cantilever arms 9 so that the vehicle load will be distributed at each end of the cantilever bars.

The swinging ends of the cantilever bars 9 are offset as at 15, and are adapted to be connected to a pair of torsion bars 16 and 17 formed of spring steel. The torsion bars 16 and 17 are rotatably supported adjacent their ends in bearing brackets 18 which are provided with oppositely flanged portions 19 to facilitate attachment of the brackets to the vehicle frame structure 5. Suitable openings 20 being provided for the passage of fastening screws or the like to securely fasten the brackets to the underside of the frame structure. In addition, a bearing bracket 21 is provided for the intermediate portion of the torsion spring bar 16, and is likewise provided with a flanged plate 22 having openings 23 to facilitate attachment of the bracket to the vehicle frame structure by nuts and bolts (not shown). The torsion spring bar 17 is further supported at its ends in bearing brackets 24, which are provided with flanged portions 25 apertured as at 26 for the passage of fastening bolts or the like (Fig. 3).

The offset ends 15 of the cantilever bars 9 are connected to the spring torsion bar 17 by pivoted levers generally indicated as at 28 and 29, and it will be noted that the pivoted levers 28 are arranged in reverse relation to the pivoted levers 29. The pivoted levers 28 include similar links 30 and 31 pivotally connected together by means of a swivel bearing 32 (see Figure 4 of the drawing), and the upper end of the link 30 is also provided with a swivel bearing S terminating in a pin 33 which is pivotally connected to the offset portion of the cantilever arm 9. The other link 31 is provided with a boss 34 which is rigidly affixed to one end of the spring torsion bar 17. Similarly, the pivoted levers 29 include links 35 and 36 connected in exactly the same manner as are the links 30 and 31, the upper end of the link 35 being connected to the other of said cantilever arm extensions 15 by means of a pivot pin 38. A boss 39 is formed on the pivoted link 36, and is rigidly affixed to the other end of the spring torsion bar 17 as is clearly illustrated in Figures 2 and 3.

The ends of the cantilever arms 15 are also connected to the end portions of the torsion spring bar 16 by means of pivoted levers generally designated 41 and 42. The pivoted lever 41 includes a pivoted link 41a which has one of its ends pivoted to the offset portion 15 of one of the cantilever arms 9 by means of a pivot pin 43, while the other end is pivotally connected to a curved link 44 by means of a pivot pin 45. The curved link 44 is provided wtih a boss 46 which is rigidly affixed to one end of the spring torsion bar 16 in substantially the same manner as are bosses 34 and 39 of the pivoted lever links 31 and 36 of the pivoted levers 28 and 29.

The pivoted levers 42 extend in a direction opposite to the pivoted levers 41, and include pivot links 47 and 48 pivotally connected as at 49. The link 47 is pivotally connected to the offset portion 15 of the cantilever arm 9 opposite the pivoted levers 41 by means of a suitable pivot pin 50. A boss 51 is formed on the link 48 and is rigidly attached to the other end of the spring torsion bar 16 in opposition to the pivoted levers 41.

The cantilever arms 9 may be arranged at each side of the vehicle with the pivoted lever linkage connecting the ends to the spring torsion bars arranged between the frame and skin covering of the vehicle. If desired, the entire structure can be confined within a small space between the frame structure and skin of the vehicle to protect the same from dirt and foreign matter, thus leaving only the wheels exposed and the axles 14 operating in vertical slots in the skin or sheathing structure.

In operation, vertical swinging movement of either one of the cantilever arms 9 from wheel deflections will cause the free end of the cantilever arm to impose rotative force or torsion on one end of the torsion spring bars 16 and 17. This force is opposed by the reaction force applied in an opposite direction to the other ends of the torsion spring bars 16 and 17, by the other cantilever arm 9 and the pivoted links 29 and 42. Thus, as road shocks cause deflection of the wheels torsional force is applied to the ends of the torsion spring bars 16 and 17, with the result that they are twisted within their elastic limit a sufficient angular distance to compensate for the deflection and then return the wheel to its normal position when the torsional strain is relieved, the swivel bearings S compensating for torsional movement between the links and the torsion bars and cantilever arms.

It is to be understood, that the form of the invention herewith shown and described is to be taken as a preferred embodiment of the same and that various changes in the shape, size, and arrangement of parts may be resorted to without departing from the spirit of the invention or the scope of the subjoined claims.

What I claim is:

1. In a vehicle suspension system, a pair of wheel mounting levers having one of their ends connected to the vehicle for vertical swinging movement, a pair of torsion spring bars supported by the vehicle adjacent the swinging ends of said levers, pivoted link means connecting one end of each of said torsion spring bars with one of said wheel mounting levers and reversely arranged pivoted link means connecting the other ends of said torsion spring bars to the other wheel mounting lever.

2. In a vehicle suspension system, a pair of wheel mounting levers each having one end connected to the vehicle to swing vertically, a pair of torsion spring bars supported by the vehicle adjacent the face ends of said levers, and opposed oppositely arranged pairs of pivotally connected links connected to said mounting levers and yieldably connecting the ends of the torsion spring bars to the ends of said wheel mounting levers so that relative movement of one of said wheel mounting levers will be yieldingly opposed by the pair of links on the other ends of said torsion spring bars to the other wheel mounting lever.

3. In a vehicle suspension system, a pair of wheel mounting levers having one of their ends pivotally connected to the vehicle to swing vertically, a pair of torsion spring bars supported by the vehicle adjacent the ends of said wheel mounting levers, reversely arranged pivoted link means connecting the common ends of said torsion spring bars to the end of one of said wheel mounting levers and reversely arranged link means connecting the other ends of said torsion spring bars to the other wheel mounting lever.

4. In a vehicle suspension system, a pair of wheel mounting levers having one of their ends pivotally connected to the vehicle to swing vertically, a pair of torsion spring bars supported by the vehicle adjacent the ends of said wheel mounting levers, reversely arranged pivoted link means connecting the common ends of said torsion spring bars to the end of one of said wheel mounting levers and reversely arranged link means connecting the other ends of said torsion spring bars to the other wheel mounting lever, said last named link means being arranged in torsion opposing relation to the first mentioned link means.

5. In a vehicle suspension system, a pair of brackets adapted to be connected to the vehicle in side by side relation, wheel mounting levers having one of their ends pivotally connected to said brackets, a pair of torsion bars supported by the vehicle adjacent the ends of said wheel mounting levers, a pair of pivoted levers affixed to the ends of each of said torsion spring bars for connecting said bars to the ends of said wheel mounting levers, said pivoted levers being arranged in opposed relation such that loading of said wheel mounting levers will set up torsional stresses in said torsion spring bars.

6. In a vehicle suspension system, a pair of brackets having upstanding lugs adapted to be affixed to a vehicle in side by side relation, a wheel supporting lever having one end rockably mounted on said bracket between the upstanding lugs to swing vertically, a pair of torsion spring bars supported by the vehicle adjacent one end of the wheel supporting levers, oppositely arranged pivoted levers connecting the ends of one of said spring torsion bars to the ends of said wheel supporting levers and oppositely arranged pivoted levers on the ends of the other of said pair of torsion bars connecting the ends of said wheel supporting levers and arranged in reverse relation to the pivoted levers on the first mentioned torsion spring bar.

7. In a vehicle suspension system, a pair of brackets having upstanding lugs adapted to be affixed to a vehicle in side by side relation, a wheel supporting lever having one end rockably mounted on said bracket between the upstanding lugs to swing vertically, a pair of torsion spring bars supported by the vehicle adjacent one end of the wheel supporting levers, oppositely arranged pivoted levers connecting the ends of one of said spring torsion bars to the ends of said wheel supporting levers and oppositely arranged pivoted levers on the ends of the other of said pair of torsion bars connecting the ends of said wheel supporting levers, arranged in reverse relation to the pivoted levers on the first mentioned torsion spring bar, and vehicle supporting wheels mounted on the wheel supporting levers.

8. In a vehicle suspension system, a pair of lever arms having one of their ends rockably mounted on the vehicle to swing vertically in parallel relation, vehicle supporting wheels mounted on said arms intermediate their ends, a pair of torsion rods extending between the lever arms and means connecting each of the lever arms to both of the torsion rods at the ends thereof.

9. In a wheel suspension system for vehicles, a pair of lever arms pivoted at one end to the vehicle, vehicle supporting wheels mounted on said arms intermediate the ends thereof, a pair of torsion spring bars extending transversely of the vehicle, pivoted link means connecting the ends of each lever arm to the ends of one of said torsion spring bars and pivoted link means connecting the end of each lever arm to the ends of said other torsion spring bar.

10. In a suspension system for vehicles, a pair of cantilever arms having one of their ends pivotally connected to the vehicle, vehicle supporting wheels mounted on the cantilever arms, a pair of torsion spring bars supported on the vehicle adjacent the ends of said cantilever arms, link means arranged in reverse relation for connecting the ends of one of said torsion spring bars to the ends of said cantilever arms so that movement of one of said cantilever arms will be yieldingly opposed by the link means of the other end of said bar to the other cantilever arm.

HOWARD COLEMAN.

REFERENCES CITED

The following references are of record in the file of this patent:

UNITED STATES PATENTS

| Number | Name | Date |
|---|---|---|
| 2,060,015 | Barnes et al. | Nov. 10, 1936 |
| 2,168,630 | Schiff | Aug. 8, 1939 |
| 2,251,698 | Willson | Aug. 5, 1941 |
| 2,404,121 | Black | July 16, 1946 |